Dec. 26, 1944.  J. J. CROWE  2,365,942
TORCH
Filed June 13, 1940
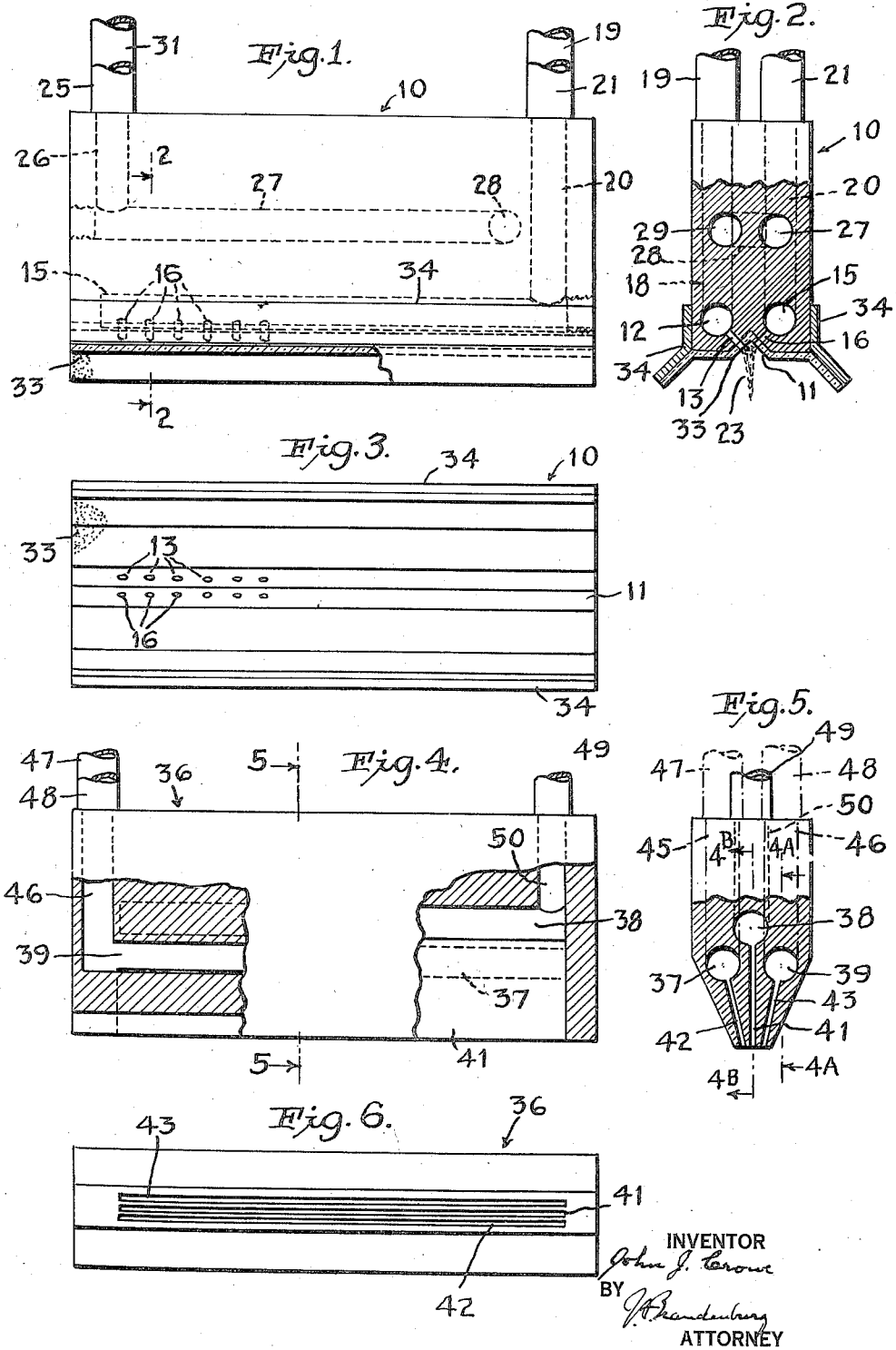
INVENTOR
John J. Crowe
BY
J. Brandenburg
ATTORNEY Patented Dec. 26, 1944

2,365,942

UNITED STATES PATENT OFFICE 2,365,942

TORCH

John J. Crowe, Westfield, N. J., assignor to Air Reduction Company, Incorporated, New York, N. Y., a corporation of New York Application June 13, 1940, Serial No. 340,273

9 Claims. (Cl. 158—27.4)

This invention relates to torches, such as oxy-acetylene torches, and more particularly to multi-flame, or ribbon flame torches, such as used for tube welding, flame hardening, dehydrating, and other operations that require an extended flame system.

One object of the invention is to provide an improved torch of the multi-flame or ribbon flame type, in which an external mixing of the oxygen and fuel gas prevents flash-backs even though the tips become red hot. Torches made in accordance with this invention will continue to operate even if they become so hot that acetylene in the torch begins to dissociate.

One feature of the invention relates to a novel torch construction by which ribbon flames are produced by impingement of separate streams of oxygen and fuel gas brought together outside of the torch.

Another object of the invention is to improve the efficiency of an oxy-fuel gas torch by utilizing a portion of the heat that ordinarily goes to waste through conduction back into the cooling water of the torch, or into the products of combustion to increase their temperature. This saving in heat is accomplished by combining a refractory shield with the torch tip in such relation that the shield retards the transfer of heat from the flame system to the metal of the tip, and actually assists the flame heating by reflection and radiation of heat to the work.

Other objects, features and advantages of the invention will appear or be pointed out as the specification proceeds.

In the accompanying drawing, forming part hereof:

Fig. 1 is a side elevation of a torch embodying this invention, one side of the shield being partly in section;

Fig. 2 is a sectional view taken on the line 2—2 of Fig. 1;

Fig. 3 is a bottom plan view of the torch shown in Figs. 1 and 2;

Fig. 4 is a side view of a modified form of the invention, with the left-hand portion of the torch shown in section along the line 4A—4A of Fig. 5, and the right-hand portion of the torch shown in section along the line 4B—4B of Fig. 5;

Fig. 5 is a sectional view taken on the line 5—5 of Fig. 4; and

Fig. 6 is a bottom view of the torch shown in Figs. 4 and 5.

The embodiment of the invention shown in Figs. 1-3 includes an elongated block tip 10 with an inverted V groove 11 in the tip face through- out the entire length of the block. A distributing chamber 12, close to the tip face, has short jet passages 13 opening through one side wall of the groove 11 substantially at right angles to the side wall. A similar distributing chamber 15 on the other side of the tip block has jet passages 16 opening through the other side wall of the groove 11.

A conduit 18 at one end of the tip block connects the distributing chamber 12 with a fuel gas supply pipe 19. The torch is intended for use with acetylene, but it is not limited to such use. An upwardly extending conduit 20 connects the distributing chamber 15 with an oxygen supply pipe 21.

The jet orifices or passages 13 are preferably evenly spaced along the length of the torch face and each of the orifices 13 is opposite one of the jet passages or orifices 16, and in the illustrated embodiment of the invention the axis of each of the jet passages or orifices 13 lies in the same plane as the corresponding orifices 16 on the other side of the groove.

The gas streams or jets from the confronting orifices 13 and 16 come together and mix midway between the orifices, and the mixture burns in a fish-tail flame 23. The gas stream that forms the flame 23 is a resultant of the jets issuing from the orifices 13 and 16. The successive orifices 13 and the successive orifices 16 are preferably spaced close enough to one another lengthwise along the torch face to cause the fish-tail primary combustion flames to touch or overlap and form a continuous ribbon flame.

The torch is cooled by fluid, preferably water, that enters the torch block from a pipe 25, flows down through a passage 26, along a longitudinal chamber 27, through a cross passage 28, back through a second longitudinal chamber 29 to an exhaust passage that communicates with a discharge pipe 31.

The face of the torch is covered with a coating of refractory material 33 which may be asbestos or aluminum oxide. These substances are given by way of illustration only. The refractory material 33 is a shield that retards the flow of heat into the metal face of the torch block and when the face of this shield becomes highly heated it radiates a substantial amount of heat to the work-piece and supplements the heat of the flames.

The radiating surface of the refractory material can be increased by attaching wings 34 to the tip block and extending the shield of refractory material 33 across the bottom faces of the wings. In Fig. 2 the wings 34 are shown extending downward at an angle of approximately 45°, but they may be disposed at other angles or may extend horizontally. The shape of shield shown in Fig. 2 has the effect of concentrating the heat, but for some uses the downwardly extending wings would be in the way.

Figs. 4–6 show a modified form of the invention in which a block tip 36 has three distributing chambers 37, 38 and 39. The center distributing chamber 38 has a central slot orifice 41 that opens through the bottom face of the torch. The side distributing chambers 37 and 39 have slot orifices 42 and 43, respectively, opening through the bottom face and converging toward the central slot orifice 41.

Oxygen is supplied to the side distributing chambers 37 and 39 through vertical passages 45 and 46, respectively, in the torch block, and pipes 47 and 48 connected to the torch block. Fuel gas, such as acetylene, is supplied to the center distributing chamber 38 through a pipe 49 connected to the torch block, and passage 50 within the block.

Streams of oxygen issuing from the slot orifices 42 and 43 strike the jet of fuel gas from the central orifice 41 just below the face of the tip block 36, and these gases mix and form a resultant oxy-fuel gas mixture which burns as a ribbon flame along the full length of the orifice slots.

Different angles of convergence for the slot orifices 42, 43 can be used, but if the acute angle at which the streams from the side orifices 42, 43 converge with each other and with the stream from the central slot orifice 41, is too small, the gases do not mix as readily.

If less mixing of the streams is required, the orifices can be disposed at smaller angles. One way by which the necessary mixing can be reduced is to supply an oxy-fuel gas mixture to the central chamber 38 with the amount of oxygen considerably less than that required for primary combustion of the fuel. With such a lean mixture there is very little danger of flash-backs. The additional oxygen for the combustion is supplied by the streams issuing from the side slot orifices 42, 43.

It will be evident that the kind of gas supplied to the central chamber 38 and to the side chambers 37 and 39 can be reversed. That is, the oxygen can be supplied to the central chamber 38 and the fuel gas to the side chambers 37 and 39, or vice-versa. The torch block 36 is preferably cooled by a circulating system similar to that of the torch shown in Figs. 1–3. The illustration of the cooling system is not repeated in Figs. 4–6.

The refractory shield or coating shown on the torch of Figs. 1–3 can be used with the torch of Figs. 4–6, and the torch of Figs. 4–6 can be made with an inverted V groove in its face if desired. Other changes and modifications can be made in the illustrated embodiments of the invention, and some features can be used without others.

I claim:

1. A torch including a tip with a face through which gas is discharged for combustion in heating flames, wings connected to and supported by the tip and extending outward from the sides of the tip, and a coating of refractory material on the face of the tip and on the corresponding sides of said wings for radiating heat to a work-piece that is being heated by the flames.

2. An oxy-fuel gas heating torch having a face through which gas is discharged to a flame that heats a work-piece, and a coating covering all of the surface of the face that is exposed to radiation of heat from the work-piece, said coating being of refractory material, and of different material than the face of the torch, for retarding heat flow into the torch and for reflecting and radiating heat to the work-piece in the same general direction as that in which the flame is projected.

3. An oxy-fuel gas torch tip having a face with an opening through which gas is discharged, and a shield of refractory material different from the material of the tip face and covering the surface of said face and having an opening at least as large as the opening through the face in register with said opening through the face, said shield of refractory material reducing heat flow into the tip and reflecting and radiating heat in the same general direction as that in which gas is discharged from the tip.

4. An oxy-fuel gas torch comprising a metallic tip block having a relatively wide elongated face with jet orifices opening through the face for supplying gases for oxy-fuel gas flames immediately below the torch face for an extended distance lengthwise of the block, and a coating of refractory material on the face of the tip block through which the jet orifices open for reducing heat flow into the block and for reflecting and radiating heat in the same general direction as that in which the oxy-fuel gas flames are projected to add to the effectiveness of the heating of the flames.

5. An oxy-fuel gas torch comprising a metallic tip block having a relatively wide elongated face and jet orifices opening through the face for supplying gas for oxy-fuel gas flames immediately below the torch face for an extended distance lengthwise of the block, and a coating of refractory material covering the entire face of the torch including the region of the orifices, said coating of refractory material having openings therein in registry with, and at least as large as the orifices of the tip block, said refractory coating reducing heat flow into the block and reflecting and radiating heat in the same general direction as that in which the oxy-fuel flames are projected to add to the effectiveness of the heating of the flames.

6. An external-mixing oxy-fuel gas torch comprising a relatively wide elongated metallic block with a face having separate orifices through which fuel gas and oxygen are discharged in converging streams that mix just below the face of the block to produce heating flames, and a shield of refractory material located between the block and said heating flames and having openings therein in registry with and at least as large as the orifice of the block, said refractory shield being so positioned and arranged as to reduce heat flow into the block and to reflect and radiate heat from said flames in the same general direction as that in which the flames are projected.

7. An oxy-fuel gas torch comprising an elongated block having separate distributing chambers for oxygen and fuel gas extending longitudinally therethrough and longitudinally spaced passages extending from each of said chambers to the face of the block, said passages being arranged in pairs with an oxygen passage opposite a fuel gas passage, the passages of each pair converging, the angle of convergence of said pairs of passages and their spacing longitudinally of the block being such that the streams of oxygen and fuel gas emerging from their respective passages meet and produce a resultant gas stream, the primary combustion of which produces a continuous flame extending longitudinally of the block, and wings supported by the block and extending longitudinally thereof outwardly from the face of the block to at least partially enclose the flame produced by the combustion of said resulting gas stream.

8. An oxy-fuel gas torch comprising an elongated block having separate distributing chambers for oxygen and fuel gas extending longitudinally therethrough and longitudinally spaced passages extending from each of said chambers to the face of the block, said passages being arranged in pairs with an oxygen passage opposite a fuel gas passage, the passages of each pair converging, the angle of convergence of said pairs of passages and their spacing longitudinally of the block being such that the stream of oxygen and fuel gas emerging from their respective passages meet and produce a resultant gas stream, the primary combustion of which produces a continuous flame extending longitudinally of the block, wings supported by the block and extending longitudinally thereof outwardly from the face of the block to at least partially enclose the flame produced by the combustion of said resulting gas stream, and a coating of refractory material on the face of the tip and on the corresponding sides of the wings for reflecting and radiating heat to a work-piece that is being heated by the flame.

9. An oxy-fuel gas torch comprising an elongated block having separate distributing chambers for oxygen and fuel gas extending longitudinally therethrough and longitudinally spaced passages extending from each of said chambers to the face of the block, said passages being arranged in pairs with an oxygen passage opposite a fuel gas passage, the passages of each pair converging, the angle of convergence of said pairs of passages and their spacing longitudinally of the block being such that the streams of oxygen and fuel gas emerging from their respective passages meet and produce a resultant gas stream, the primary combustion of which produces a continuous flame extending longitudinally of the block, outwardly diverging wings extending from the block along the outer longitudinal edges thereof to at least partially enclose the flame produced by the combustion of said resultant gas stream, and a coating of refractory material on the face of the block and on the corresponding sides of said wings for reflecting and radiating heat to a work-piece that is being heated by the flame.

JOHN J. CROWE.